G. I. Dulaney.
Sewing Machine.

No. 3825 Reissued Feb. 8, 1870.

Witnesses.

L. F. Whitney

Beckwith West

Inventor.

John S. Gallaher Junior
Attorney for Geo. L. Dula

BEST AVAILABLE COPY

G. L. Dulaney.
Sewing Machine.

No. 3825 Reissued Feb. 8, 1870.

Witnesses.

L. F. Whitney
Beckwith West

Inventor.

John S. Gallaher Jun
Attorney for Geo. L. Dulaney

G. L. Dulaney.
Sewing Machine.

No. 3825 Reissued Feb. 8, 1870.

Witnesses.

L. F. Whitney

Beckwith West

Inventor.

John S. Gallaher Junior
For George L. Dulaney

UNITED STATES PATENT OFFICE.

GEORGE L. DULANEY, OF MECHANICSBURG, PENNSYLVANIA.

IMPROVEMENT IN SEWING-MACHINES.

Specification forming part of Letters Patent No. 37,617, dated February 10, 1863; reissue No. 3,825, dated February 8, 1870.

*To all whom it may concern:*

Be it known that I, GEORGE L. DULANEY, of Mechanicsburg, in the county of Cumberland and State of Pennsylvania, but formerly of Mount Jackson, in Shenandoah county, and State of Virginia, have invented certain new and useful Improvements in Sewing-Machines; and I do hereby declare that the following, taken in connection with the drawings which accompany and form part of this specification, is a description of my invention sufficient to enable those skilled in the art to practice it.

Figure 1:
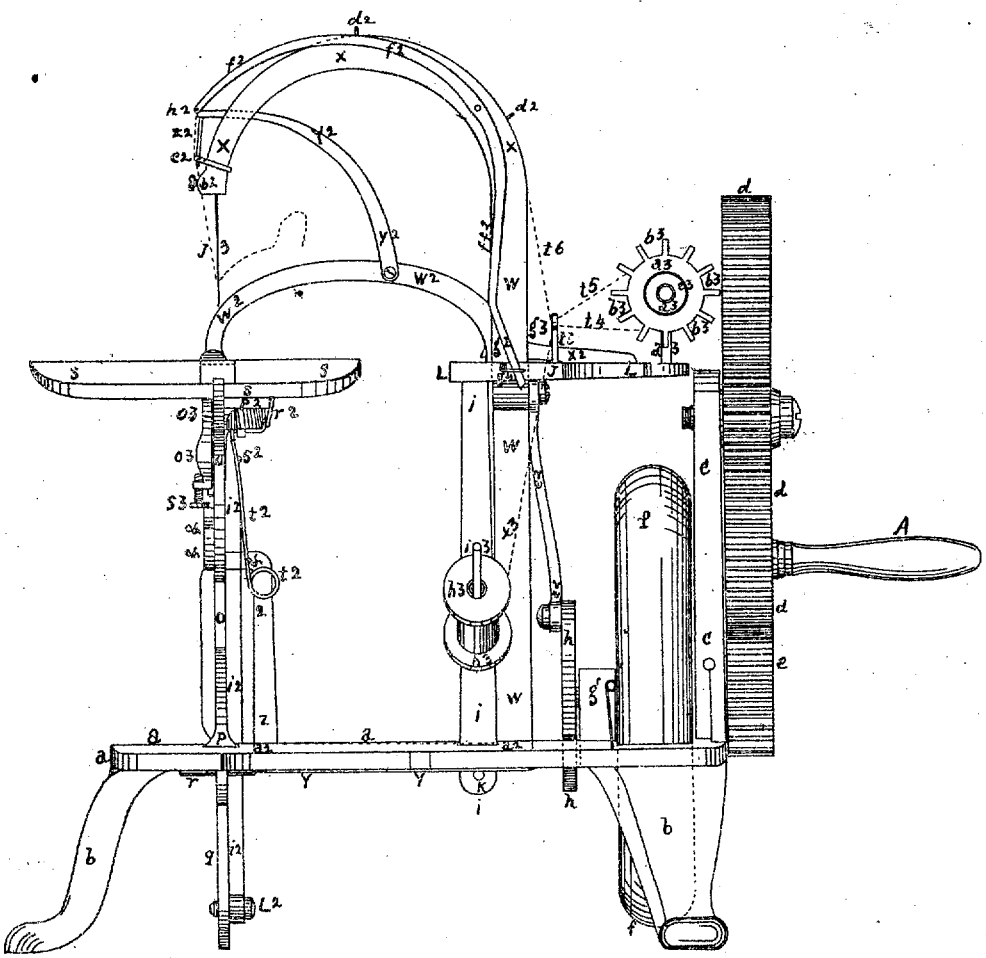
Figure 2:
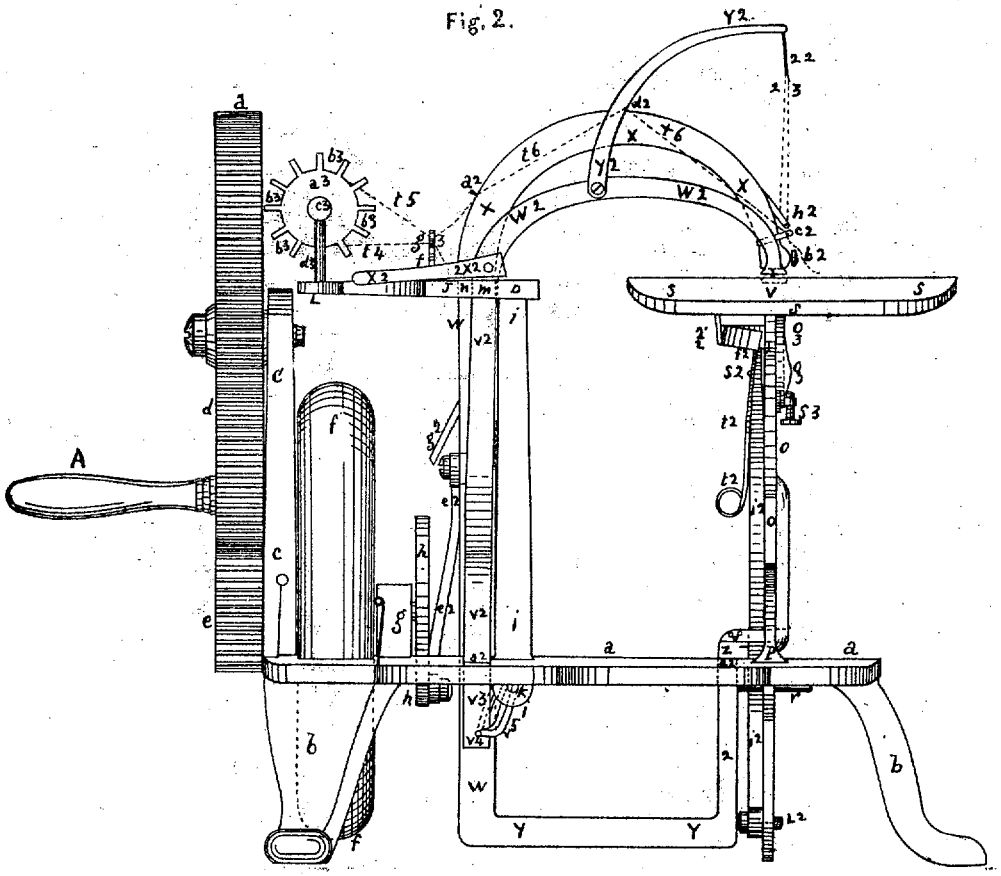
Figure 4:
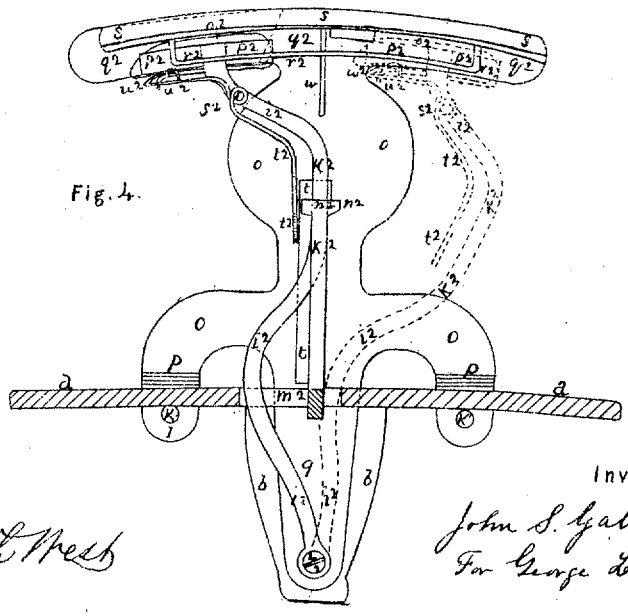
Figure 5:
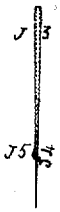

Figure 1 is a right-hand elevation of the machine; Fig. 2, a left-hand elevation, and Fig. 3 a front elevation, of the same. Fig. 4 represents a reverse view of the pedestal cloth-table, with the shuttle, peculiar shuttle-carrier, and feed devices. Fig. 5 represents the needle detached.

My improvements relate more especially to the construction and operation of the needle-bar; to the construction of the shuttle and its carrier, and to the manner of actuating the shuttle; to the manner of, and devices for, producing the feed-motion; to a novel mode and means for giving tension to the needle-thread; and to the devices for taking up the slack thread.

The better to enable others to construct and use my improvements, the following is a description thereof:

At *a*, Figs. 1 and 2, is represented a suitable bed-plate or platform, mounted, if desired, on suitable supports or legs *b*; or it may be attached to any suitable stand or table, so as to work the machine, if desired, by a treadle. To the platform is cast a standard, *c*, to which is connected, in suitable bearings, the main cog-gear driving-wheel *d* and the small pinion gear-wheel *e*, both working into each other, and attached, by their journals or axles, outside of the standard. The axle of the small wheel or pinion extends horizontally through the standard, and the fly or balance wheel *f* is confined on the axle of the pinion, and on the inside of the standard *c*, as shown in Figs. 1 and 2, the axle being long enough to extend through a short standard, *g*, and having affixed to its end a disk or circular plate, *h*. The balance-wheel *f* and the disk *h* extend down through suitable openings formed in the platform *a*. At *i i*, Figs. 1 and 2, is shown the side view of a striding or arch-like standard, which is formed with a short arm, *j*. Said standard is detachable, and is confined in position by tenons in the bed-plate, and keyed or pinned on the under side, as at *k k*. To the upper end of said standard is attached a cross-head piece, L L, formed with a mortise to fit over the short arm *j*. This short arm has two mortises formed in it, one on each side, as indicated by the dots at *m n*, Figs. 1 and 2. At *o o* is a pedestal-standard, formed with shoulders *p p* and tenon ends, keyed through the platform *a*, as indicated at *r r*. This pedestal-standard has cast or formed upon its upper end a curved table-plate or cloth-support, *s*, and is also formed with a vertical slot, *t*, and a smaller vertical slot, *u*. The cloth-support *s* is formed with a slot, *v*. (Shown in dotted lines in Figs. 2 and 3.) At *w w* is indicated a vertically-arranged sliding needle-bar, formed with an upper curved or arch-like end, *x x*, and a lower elbow-like continuation, Y Y, with a forearm-extension, *z z*, and a finger-like extremity, *& &*. This peculiar needle-bar is formed of one continuous piece, its main length working vertically immediately behind the arched standard *i i*, Figs. 1 and 2, and fitting in the mortise *n*, as dotted in Figs. 1 and 2. The elbow or lower portion Y Y and the forearm *z z* are fitted to work in notches in the platform, as indicated by dots $a^2$. The finger-like extremity *& &* is bent through the slot *t t* of the pedestal-standard *o o*. The needle-arm *w w* has its arched part formed with a head and a set-screw to hold the needle, as indicated at $b^2$. On the end of the needle-bar is a small yoke-like device, $c^2$, formed with two small eyes on the left side, and one eye on the right.

At $e^2$ $e^2$, Figs. 1 and 2, is indicated a suitable connecting-rod or pitman, attached by its ends to the needle-bar *w* and to the disk *h h*; and to the long arm of the needle-bar *w*, on its left side of the arched part, is attached, by a small fulcrum-pin or pivot, a curve-shaped vibrating lever or slack-take-up device, $f^2$ $f^2$, with bent lower end $g^2$, and a small eye, $h^2$, formed through the upper end, as shown in Figs. 1 and 2.

At $i^2$ $i^2$ is shown the oscillating shuttle-driving lever, of curved shape, but having a straight portion, $k^2$ $k^2$. (See Fig. 4.) This shuttle-driver is formed with a shuttle-carrier, $p^2$ $p^2$, and is connected to the lower part $q$ of the pedestal $o$ by a screw or pin axis, $L^2$, Figs. 1, 2, 4, and, passing upwardly through a slot, $m^2$, rests within the fork or crotch $n^2$, Fig. 4, and continues upwardly beneath the cloth-table $s$, to receive the shuttle $o^2$ within the carrier $p^2$ $p^2$ of the shuttle-driver $i^2$ $k^2$, the shuttle being held or supported laterally by the side of the race $q^2$ $q^2$, Figs. 3 and 4. The shuttle-carrier is also supported by a lateral guide bar or staple, $r^2$, Figs. 1, 2, 4. Attached by a suitable axis, $s^2$, to the side of the shuttle-carrier arm is a gravitating pendent shuttle-adjuster, $t^2$ $t^2$, formed with a bowed end, $u^2$, Figs. 3 and 4. This bowed end rests upwardly within a slot or a depression, $u^4$, formed in the under side of the shuttle, and indicated by dots in Figs. 3 and 4.

Figure 3:
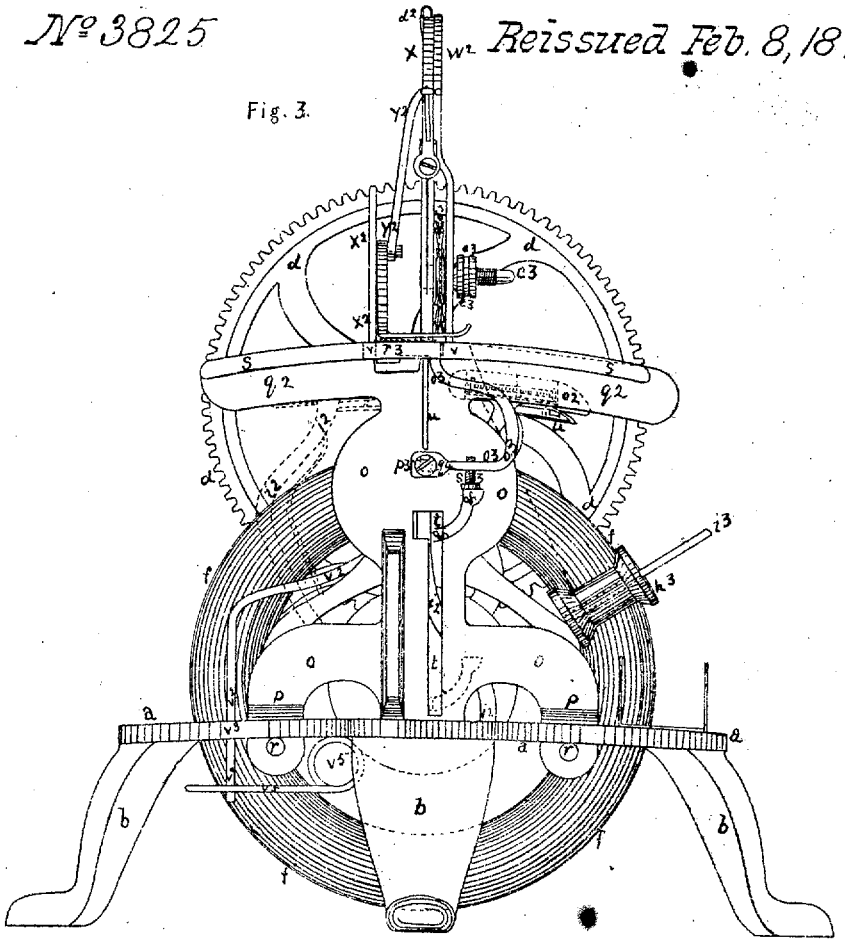

At $o^3$ $o^3$ is indicated the gravitating feed device, of the curved shape shown, its butt-end formed with an elongated opening, $p^3$, extending vertically, and through which passes the pivot or fulcrum-screw $q^4$, and whereby the feed device is attached to the outside of the pedestal $o$ $o$, Fig. 3. The upper end of this feed device is serrated or notched, as indicated at $r^3$, Fig. 3, and works freely in the slot $v$ of the cloth-table $s$ $s$. Through the short curved end of the feed device $o^3$ $o^3$ is an adjusting or stitch-regulating screw, $s^3$.

At $v^2$ $v^2$ $w^2$ $w^2$ is shown the gravitating stripper-bar or pressure-pad, the upper part of which is arched, and the lower part straight, its end passing downwardly through the platform $a$ $a$, as at $v^3$, and formed with a notch, $v^4$, in which, if found necessary, may be employed a suitable spring, $v^5$, to produce greater force or pressure of the pad against the material to be sewed. To this stripper bar or pad is attached a cam or eccentric lever device, $x^2$, and at $Y^2$ is attached a suitable curved bar, to the end of which is a small dependant, $z^2$, formed of a length of flexible wire bent together, forming a small delicate fork-like device; or a solid strip of metal may be split longitudinally, and the ends thereof opened or slightly extended, so as to answer the desired purpose, and to act as a thread-gripe or take-hold, the particular office of which will be more fully explained hereinafter.

At $a^3$ $a^3$, Figs. 1 and 2, is indicated a circular rotating tension device, formed of two similar thin, flexible, concave or dished disks provided with series of flexible radials $b^3$ $b^3$ $b^3$, at equal intervals apart. These two disks are both fitted together, their concave surfaces opposite, thus forming a cavity between them; and the radial arms, it will be seen, commence from their point of contact to diverge from each other, so that any two adjacent arms of the opposing disks form an angular space to receive snugly the thread and prevent its slipping, whatever may be its size or number.

Being thus fitted neatly though not solidly together, a center hole or aperture is formed through their center, by which the device is affixed to a spindle, $c^3$, formed with a screw-thread, and said spindle is attached to the end of a stud, $d^3$, which is inserted in the cross-head L L, and it is so applied to said stud that, if desired, it may be turned or swung half-way around thereon, so that the thread in its passage shall revolve the wheel in a reverse direction relatively to its adjusting-nut. On the spindle $c^3$ is a suitable nut or adjusting-tap, $e^3$, the screw-thread on the spindle being, as shown, long enough to receive another or locking nut. In the cross-head at $f^3$ is inserted a smaller stud, its upper end formed with an eye, $g^3$. At $h^3$ is indicated the spool of thread on the spindle $i^3$, inserted in the leg of the standard $i$ $i$.

When the machine is to be operated by a treadle the platform $a$ $a$ is designed to be attached to a larger stand or table of any desired shape or size.

The operation of my improvements is as follows, viz: The material to be sewed is arranged on the table $s$ $s$, so as to bear or pass off forward and in front from the operator. The thread from the spool is carried in the direction indicated by the red dotted line $t^3$, and passed through the eye $g^3$ to the right, as at $t^4$, under and around and over the radials $b^3$ $b^3$ $b^3$ $b^3$ of the rotating tension device $a^3$; then to the left downwardly, as at $t^5$, and returned through the eye $g^3$, and upwardly through the eyes $d^2$ $d^2$ of the needle-bar; thence on the inside through the first left-hand eye of the yoke-like device $c^2$, upwardly, and through the eye $h^2$ of the vibrating lever or slack-take-up device $f^2$ $f^2$; thence downwardly on the right side, and through both the outer holes of the yoke device $c^2$ $c^2$ to the left side, and finally into the eye of the needle $j^3$, Fig. 1.

The machine being set in motion by the handle A A, the main wheel working into the pinion $e$, the whole mechanism is thereby set in motion, the disk $h$ communicating action to the connecting-rod $e^2$, which causes the needle-bar $w$ $w$ $x$ $x$ Y Y to slide up and down. When the needle $j^3$ descends it enters the material, and passes far enough through it, and below the cloth-table $s$ $s$, to enable it to form the loop at the required time to allow the passage of the shuttle $o^2$ $o^2$, with its bobbin and thread.

In Fig. 1 the needle-bar $w$ $x$ Y $z$ is shown as being up to its highest point, with the needle $j^3$ in position ready to descend. The finger-like formation or feed-striker $d$ $d$ of the needle-bar $w$ is shown pressing up against the head of the screw $s^3$, which lifts the feed-bar $o^3$ $o^3$, pressing it upward, and turning it on its pivot to the left, at the same time against the material on the cloth-table $s$ $s$, the gravitating stripper-bar or pressure-pad $w^2$ $w^2$ also pressing down on the top of the material.

It will be observed that in the elevated position of the needle-bar, the shuttle $o^2$ $o^2$ is to the left-hand edge of the cloth-table, and in position as indicated in Fig. 4.

As the needle-bar $w$ $x$ Y $z$ descends to its lowest position, as in Fig. 2, the needle is shown as having penetrated the material and extended through and beneath the cloth-table $s$ $s$, where, the loop of the needle-thread being formed, the shuttle with its thread is passed through said loop, the shuttle being in position to the right, as indicated by the dotted representation of the shuttle-carrier $p^2$ $p^2$, Fig. 4, and thus, as the needle alternately enters the material, and the shuttle passes into and through the loop of needle-thread, the two threads are interlocked, the stitch is formed, and the sewing is effected.

The peculiar features, however, of my improvements are, as hereinafter named, as follows: The needle-bar $w$ $x$ Y $z$ & is formed of a continuous single piece of metal, which, because of its peculiar shape, is made to perform the fourfold office of actuating the needle $j^3$, impelling the shuttle-driver $i^3$ $k^2$, operating the feed-bar devices $o^3$ $p^3$, and also carrying with it and operating the vibrating lever or slack take-up $f^2$ $f^2$. This slack-take-up device, thus connected on an axis to the side of the needle-bar, moves therewith, and in passing upwardly the deflected end $g^2$ strikes against the small staple $g^4$, by which means the eye end $h^2$ of the same is raised or thrown upward, describing a short curve, and thereby drawing up the slack thread of the needle, so as to prevent undue length and spread of the loop. As the needle-arm descends the vibrating lever $f^2$ is carried down with it, the straight part $f$ $f^2$ bearing against the small staple $g^4$, thus preventing further vibration until the needle-arm is again carried up.

It will be observed that the shuttle-driver $i^2$ $i^2$ has a straight part, $k^2$, which is designed to cause a cessation or slight interval of motion of the shuttle, the object of which intermittent office is to keep the shuttle at rest sufficiently long to allow the needle to pass to its utmost extent without coming in contact with the shuttle.

With reference to my improved feed-motion device $o^3$ $p^3$ it will be observed that it is partly self-acting by its inherent gravity, and being suspended on its fulcrum by the elongated slot or opening, having sufficient play up and down and laterally, so as to describe somewhat of an oblique double movement, by which means the material being sewed is pressed upwardly against the pressure-pad $w^2$ $w^2$, and forward horizontally from the operator, and after thus moving and returning to its original position the feed device $o^3$ $p^3$ falls beneath the material, thereby releasing it at the required time, and thus alternately feeding the material regularly and affording the required stitch. This feed device may be so regulated by the set-screw $s^3$ as to give any required length of stitch. Thus, for instance, if the screw $s^3$ be turned to the right the stitch is shortened, and if to the left the stitch is lengthened, owing to the finger & & continuing more or less against the screw.

Another feature of my improvements is the pendent, gravitating, self-acting, shuttle-adjusting device $s^2$ $t^2$ $t^2$, the object of which is to lift the shuttle slightly, and thereby accommodate it to the curved sweep or stroke of the shuttle-carrier $p^2$ $p^2$, and prevent any undue sweep or play of the shuttle in the race $q^2$ $q^2$, the bow part $u^2$ $u^2$ bearing up and within the slots or depression in the under side of the shuttle, as indicated in dotted lines in Fig. 4.

Another peculiar feature of my improvements is the little griper or finger device $z^2$, Fig. 1, which is designed to gripe or hold up the slack-thread of the needle $j^3$ should there be too much slack.

As the needle-bar $w$ $x$ Y moves upwardly the cross-thread in the front holes of the yoke device $c^2$ $c^2$ is forced between the gripe ends, as at $z^3$, Fig. 2, and is held up until the needle withdraws from the material on the table $s$ $s$, thus most effectually preventing any undue slack of the thread or its tension.

Another novel feature of my improvements is the rotating radial tension device $a^3$ $b^3$ $b^3$, which is regulated by the set-screw or nut $e^3$ $e^3$, Fig. 3, which, being turned more or less, tightens the tension by compressing the central dished or bowed part, thus dispensing with the use of spiral springs.

By having the diverging radials $b^3$ $b^3$ the thread is caught at intervals. Hence, should any inequalities occur in the thread, the tension is not interfered with, as would be the case if a continuous grooved disk or wheel were used, which method is employed in many sewing-machines.

The advantages resulting from using two disks with the radial arms and intervening spaces are that each disk and its arms may be struck out of sheet metal, complete for use, by one blow of the die-cutter, and all of its radials dished or bent outward by the same blow; that the cutter thus leaves smooth edges on all the radials on the side against which the thread passes, the outer ragged or bearded edges on the side which was the under one in cutting being always on the outer side, and never in contact with the thread; that the spaces between the radials afford ample room for filing away any accidental inequalities or roughness, and allow the placing of the two disks together, so that the edge of one radial shall not (as must be the case of a single disk having no spaces cut away, and whose radial wings are bent in alternate directions) make an abrupt acute angle with its next adjacent radial, thus avoiding the carrying of the thread around the edges of the radials, and thereby chafing and cutting it, and also avoiding the jamming of the thread into such an angle.

And another feature of my improvements is the shuttle, formed with a groove or a slot on its under side, as indicated by the line $u^4$, Fig. 4. This slot or depression is to receive the bowed adjuster $u^2$ $u^2$, so as to adjust the shuttle to its place, as hereinbefore stated.

Having thus shown and described my several improvements in sewing-machines, what I claim as of my own invention, and desire to secure by Letters Patent of the United States, is as follows, namely:

1. The vertically-acting needle-arm formed of one piece of metal, as indicated at $w$ $x$ Y $z$ &, Figs. 1 and 2, which performs the several different offices or mechanical functions, as herein set forth and described.

2. The intermittently-acting shuttle-carrier device $i^2$ $k^2$ $p^2$, and guide-rod $r^2$, Fig. 4, combined with the gravitating self-acting shuttle-adjusting device $s^2$ $t^2$ $u^2$, Fig. 4, as shown and described.

3. The gravitating self-adjusting slotted feed device $o^3$ $o^3$ $p^3$ $q^4$, Fig. 3, formed and hung as shown, and combined with the vertically-reciprocating needle-bar, and operated in the manner described.

4. The self-acting gravitating pad $v^2$ $v^2$ $w^2$ $w^2$, as constructed and combined with the self-acting gravitating feed device $o^3$ $o^3$ $p^3$ $q^4$, the lever device $x^2$ $x^2$, the curved bar or tension device $y^2$ $y^2$, and the small dependent, flexible, forked-like device $z$, Figs. 1, 2, and 3, substantially as shown and described.

5. The shuttle $o^2$ $o^2$, constructed with the bottom slot or depression $o^4$, Fig. 4, and the combination therewith of the gravitating self-acting shuttle-adjusting device $s^2$ $t^2$ $u^2$, substantially as shown and described.

6. The vibrating lever or slack-thread adjuster $f^2$ $f$ $f^2$ $g^2$, Fig. 1, as constructed, when combined with the needle bar or arm $w$ $x$ Y $z$ &, and operating substantially as set forth and described.

7. The curved bar or tension device $y^2$ $y^2$ $z^2$, Figs. 1, 2, and 3, in combination with the vibrating lever or slack, take-up device $f^2$ $f^2$ $g^2$ $h^2$, so as to produce the desired effect, in the manner as shown and described.

8. A tension-wheel, free to move on its supporting-spindle, and composed of two pieces or disks of thin sheet metal, placed face to face, each piece having flexible radial arms and intermediate spaces, the arms being so bent that those of one disk shall diverge from those of the other disk, thereby leaving between them an angular space for the thread.

9. A tension-wheel, having a provision for imparting and controlling a yielding pressure for adjusting the tension through the instrumentality of sheet metal of bowed or dishing form, and a regulating-screw, substantially as described.

10. The combination of disks, having flexible radial arms and flexible dished centers, with a screw-threaded spindle, a supporting-standard, and an adjusting nut or nuts, substantially as shown and described.

GEORGE L. DULANEY.

Witnesses:
J. W. DULANEY,
JOSEPH LEAS.